(12) United States Patent
Benjamin et al.

(10) Patent No.: US 7,255,514 B2
(45) Date of Patent: Aug. 14, 2007

(54) METHOD AND SYSTEM FOR REMOVING CONTAMINANTS FROM SOIL

(75) Inventors: Thomas Alan Benjamin, Fairbanks, AK (US); Craig Jay Jones, Fairbanks, AK (US); Luther Alba Brice, Fairbanks, AK (US)

(73) Assignee: Brice Environmental Services Corporation, Fairbanks, AK (US)

( * ) Notice: Subject to any disclaimer, the term of this patent is extended or adjusted under 35 U.S.C. 154(b) by 0 days.

(21) Appl. No.: 11/156,279

(22) Filed: Jun. 17, 2005

(65) Prior Publication Data

US 2006/0140725 A1 Jun. 29, 2006

Related U.S. Application Data

(60) Provisional application No. 60/584,941, filed on Jul. 1, 2004.

(51) Int. Cl.
*B09C 1/02* (2006.01)

(52) U.S. Cl. .................................. 405/128.75

(58) Field of Classification Search ........... 405/128.75, 405/128.7, 128.1
See application file for complete search history.

(56) References Cited

U.S. PATENT DOCUMENTS

| | | | |
|---|---|---|---|
| 4,133,748 A | 1/1979 | Schaffer, Jr. et al. | 209/17 |
| 4,234,415 A | 11/1980 | De Tuya Casuso | 209/172.5 |
| 4,253,942 A | 3/1981 | Gäumann | 209/17 |
| 4,715,949 A | 12/1987 | Watts | 209/17 |
| 4,913,803 A | 4/1990 | Earls et al. | 209/17 |
| 4,969,775 A * | 11/1990 | Cappel et al. | 405/128.75 |
| 5,098,224 A | 3/1992 | Netzel et al. | 405/128 |
| 5,302,289 A | 4/1994 | McClung et al. | 210/634 |
| 5,476,994 A | 12/1995 | Trezek | 588/256 |
| 5,599,372 A * | 2/1997 | Pommier | 405/128.75 |
| 5,772,776 A * | 6/1998 | Holbein | 405/128.75 |
| 6,245,241 B1 | 6/2001 | Kupczik et al. | 210/759 |
| 6,264,040 B1 | 7/2001 | Mankosa et al. | 209/158 |
| 6,273,263 B1 | 8/2001 | Bergeron et al. | 209/17 |
| 6,306,641 B1 * | 10/2001 | Horn et al. | 405/128.7 |
| 6,325,079 B1 | 12/2001 | Amiran | 134/25.1 |
| 6,422,789 B1 | 7/2002 | Brewer | 405/128.75 |
| 6,450,344 B1 | 9/2002 | Kitano et al. | 209/170 |
| 6,464,430 B1 | 10/2002 | Maleck | 405/128.6 |
| 6,758,633 B2 * | 7/2004 | Yen | 405/128.75 |
| 2004/0082828 A1 | 4/2004 | Bergeron | 588/238 |

OTHER PUBLICATIONS

"Microscale Location, Characterization, and Association of Polycyclic Aromatic Hydrocarbonson Harbor Sediment Particles", Ghosh, et al., vol. 34, No. 9, 1729-1736, Environ. Sci. Technol., 2000.*

"Contaminant Source Apportionment by Pimms Lead Isotope Analysis and Sem-Image Analysis", McGill, t al., Environmental Geochemistry and Health vol. 25, No. 1, 2003.*

* cited by examiner

*Primary Examiner*—John Kreck
(74) *Attorney, Agent, or Firm*—Kenneth Watov; Watov & Kipnes, P.C.

(57) ABSTRACT

A method and system for removing contaminants from contaminated soil at a site utilizes particle size segregation and particle density segregation to yield a plurality of fractions, whereby each of the fractions are tested and identified for the presence of unacceptable levels of contaminants, and the soil fractions from the contaminated soil at the site corresponding to the identified contaminated fractions are collected for subsequent disposal or treatment, while the remaining untainted soil fractions are homogenized and returned to the site.

30 Claims, 2 Drawing Sheets

METHOD AND SYSTEM FOR REMOVING CONTAMINANTS FROM SOIL

RELATED APPLICATION

The present Applicant claims the benefit of U.S. Provisional Application No. 60/584,941, filed Jul. 1, 2004 and entitled METHOD AND SYSTEM FOR REMOVING CONTAMINANTS FROM SOIL. The teachings of U.S. Provisional Application No. 60/584,941 are further incorporated herein by reference to the extent that they do not conflict herewith.

FIELD OF THE INVENTION

The present invention relates to environmental remediation, and more particularly to a soil treatment process.

BACKGROUND OF THE INVENTION

It is generally acknowledged that years of industry have generated numerous environmentally tainted sites throughout the country and around the world, which pose health hazards to people. In recent years, efforts to clean up or remediate environmentally contaminated sites have increased dramatically. Many methods and devices for cleaning up or disposing of environmental contamination in water, air, and soil have been developed. However, the magnitude of the environmental contamination remains vast in comparison to the resources made available to solve this growing problem.

Soil contamination is a matter of concern in many locations. The ever increasing environmental awareness has produced more stringent laws and regulations for the protection of human and animal health. At least in the developed countries it is no longer tolerated for contaminated soil to be deposited in open landfills, while special deposit sites for hazardous waste become more limited and increasingly expensive.

"Soil" refers to unconsolidated and consolidated material in the ground. Soil may include natural formation material such as dirt, sand, minerals, ores, geological deposits, and rock, as well as fill material. Soil may be contaminated with chemical, biological, and/or radioactive compounds. Contamination of soil may occur in a variety of ways, such as material spillage, leakage from storage vessels, and landfill seepage. Public health concerns may arise if such contaminants migrate into aquifers or into air. Soil contaminants may also migrate into the food supply through bioaccumulation in various species part of the food chain.

To address the problem of environmental contamination and particularly as it relates to soil contamination, a range of soil treatment and decontamination techniques have been developed. These techniques involve, but are not limited to the application of fluids, biological agents, heat, vacuum, pressurized gases, and mechanical agitation. There are many ways to remediate contaminated soil. "Remediating soil" means treating the soil to reduce contaminant levels within the soil or to remove contaminants from the soil. An ex situ method of remediating contaminated soil is to excavate the soil and then process the soil in a separate treatment facility to reduce contaminant levels within the soil or to remove contaminants from the soil. Alternatively, contaminated soil may be remediated in situs.

In situ flushing operations wash away contaminated areas in the soil or in the groundwater with large amounts of water (provided the flushing water can be isolated and separated efficiently). Instead of using water, it is also possible to separate volatile organic substances from soil with (hot) steam. However, this requires an after-treatment of the extracted materials.

Washing of contaminated soil is conventional. Water can cleanse contaminating substances from soil, gravel and rocks mechanically. Water also may separate fine-grained particles (silt and clay) from coarse-grained particles (sand and gravel). In this case the water is loaded with the contaminants from the soil and needs to be treated adequately, before it can be reused or returned to surface and ground water.

One typical site of environmental soil contamination involves weapons firing ranges (e.g. small arms fire) where heavy metal contamination is a serious on-going problem. Such contamination poses substantial economic costs and environmental challenges to surrounding areas. Remediation of soil from firing ranges poses special concerns because the contaminants typically exist both as discrete particles (unfired rounds, intact expended bullets, bullet fragments and finer-sized heavy metal particles) and ionic (adsorbed) heavy metals residing on the soil grains. The ionic coatings are often the result of corrosion of the particulate lead, which can leach into the ground water and cause serious environmental and human health consequences.

Small arms firing ranges accumulate particulate lead from expended bullets. Depending on site-specific characteristics such as soil type, exposure time, and rainfall, erosion and migration of lead may occur. Soil outside of the range as well as ground water may become contaminated with lead that has corroded, dissolved, and migrated from the expended rounds. As a consequence of the heavy metal content, firing range soils typically fail Toxicity Characteristic Leaching Procedure (TCLP) tests, thus mandating that the large volume of material on such sites must be managed as hazardous waste. Current remediation strategies do not comprehensively and economically address the problem of both particulate and leachable (e.g., ionic heavy metal) soil contamination under all climatic and soil conditions.

Two distinct types of treatment goals may be applied for firing range soils: total content and leachable content. The leachable (hazardous) content is related to the total content, but is not directly proportional. The leachability of a metal can be strongly influenced by the physical and chemical conditions of the metal.

To date, no technology has been available that can simultaneously reduce both total and leachable contaminant concentrations (e.g., lead) and render soil acceptable for reuse. Soil leachability can be mitigated using stabilization; this technology has a proven track record and is available from numerous vendors. Stabilization does not remove lead, leaving the total lead content unaffected. As a result, stabilized soils tend to contain high total lead contents and must still be disposed of off-site.

Therefore, there is a need for developing a process that provides better, more rapid and less expensive environmental clean up of contaminated sites and materials. There is a further need for developing a process which has not previously been available that removes contaminants such as heavy metals to lower the total soil contaminant content as well as the leachable contaminant content. There is a further need for developing a process that can treat contaminated soil, including small arms firing range soil to meet both remediation criteria, thus enabling soil reuse instead of resorting to costly and unproductive landfill disposal.

SUMMARY OF THE INVENTION

The present invention is generally related to a method and system for removing contaminants from soil. The method and system of the present invention utilizes a particle separation process for detoxifying soil contaminated by undesirable particulates and leachable contaminants including heavy metals such as, for example, lead found in small arms firing range soils. Recognizing that small arms firing ranges are highly variable with regard to soil and contaminant characteristics, the present invention comprises unit components and process parameters that are site specific. For purposes of illustration, the present invention is described for use in decontaminating small arms firing range soils. However, the present invention is not meant to be limited to removing lead from soil, and is applicable for much broader uses.

The characteristics of the novel process of the present invention include: (1) flexibility for varying site conditions; (2) high production rates; (3) particle separation of expended bullets, bullet fragments and other dense material; (4) refinement of recovered particulate metal for recycling; and, (5) stabilization of particulate metal free soil, when required, to meet leachability requirements. The resultant detoxification of the soil facilitates on-site soil reuse while recovered particulate metals are subsequently recycled. In the preferred embodiment of the process no hazardous by products are generated, and all product streams are reused.

The present invention has a demonstrated ability to remediate small arms firing ranges to acceptable standards. Using water-based particle separation, high density contaminants in soil, such as bullets and small lead fragments, for example, are recovered for recycling. Adding a low dosage stabilization agent, when required, eliminates issues of lead leachability. Processed small arms firing range soils can subsequently be reused.

In one broad aspect of the present invention, there is provided a method for removing contaminants from contaminated soil at a site, comprising the steps of:

extracting a representative sample of the contaminated soil from the site;

segregating the sample into a plurality of size fractions according to particle size;

segregating each of the size fractions into a plurality of density fractions according to particle density;

identifying the fractions containing the presence of unacceptable levels of contaminants representing at least a portion of the total contaminant amount of the sample; and removing soil fractions from the contaminated soil at the site corresponding to the identified contaminated fractions from the sample.

In another broad aspect of the present invention, there is provided a system for removing contaminants from contaminated soil at a site, comprising:

a soil diagnostic testing and sampling facility adapted for segregating a sample of soil from the site into a plurality of fractions based on at least one of particle size and density, and for testing the plurality of fractions to identify tainted fractions containing the presence of unacceptable levels of contaminants; and a contaminated soil removing facility adapted for removing soil fractions from the contaminated soil at the site corresponding to the contaminated fractions from the sample as identified by the soil diagnostic testing and sampling facility.

BRIEF DESCRIPTION OF THE DRAWINGS

Various embodiments of the invention are described in greater detail below with reference to the drawings, in which like terms are identified by the same reference designation, wherein.

DETAILED DESCRIPTION OF THE INVENTION

Figure 1:
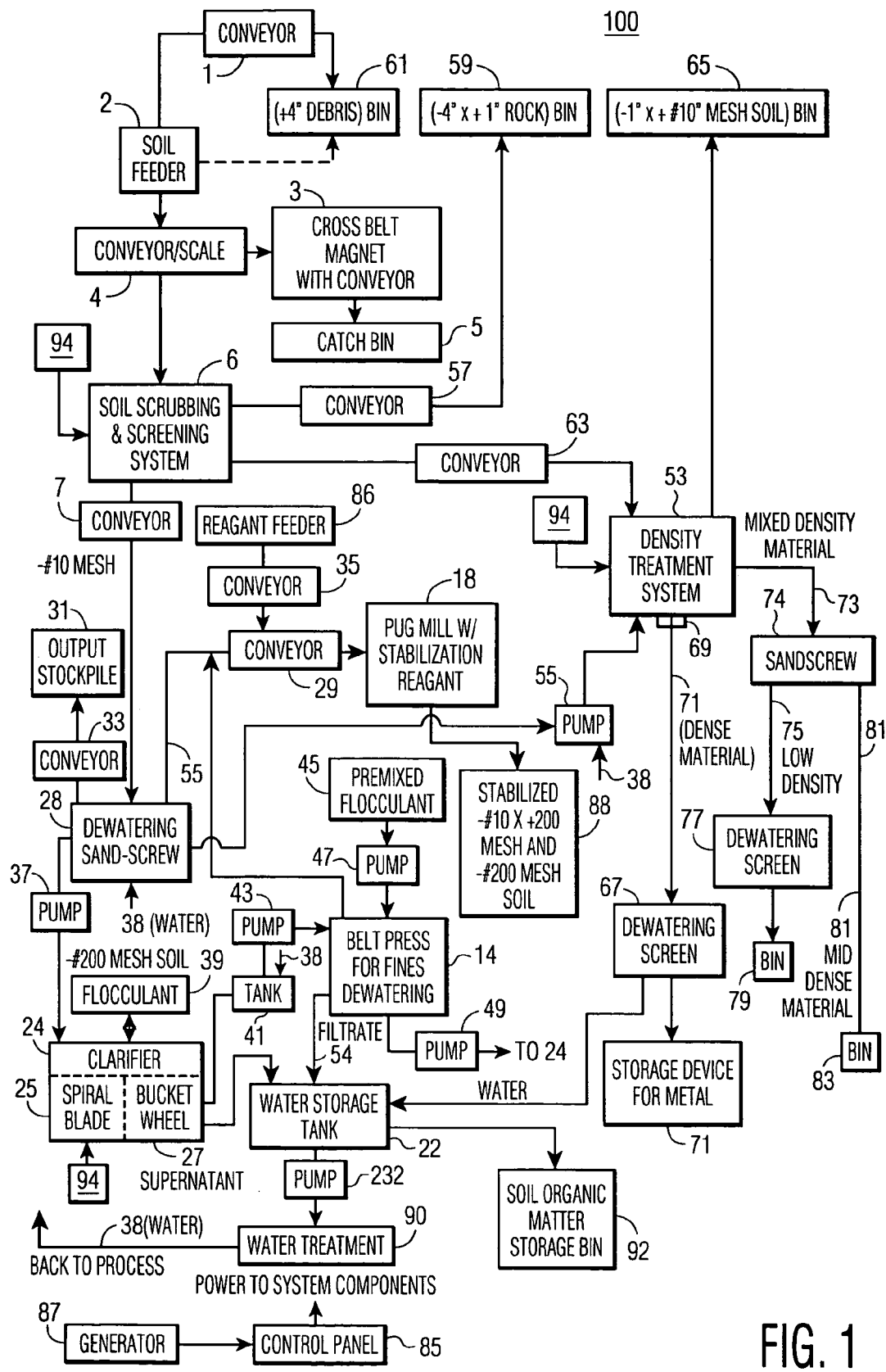
FIG. 1 is a process flow diagram for one embodiment of the invention.

The present invention is directed to a method and system for removing contaminants from soil. The present invention involves the evaluation and treatment of soil contaminated by material of density and/or size different from the native soil material. The method and system of the present invention principally utilizes the physical properties of the soil and the contaminant material to implement the removal of the contaminant. Through the present invention, portions of the soil that contain contaminants within acceptable levels can be separated from portions containing unacceptable levels of contamination. This substantially reduces the volume of soil that would require decontamination treatment or landfill disposal, thus greatly reducing the cost and labor of soil remediation, while enhancing soil re-use.

The method and system of the present invention utilizes a series of steps involved in separating and segregating various components of a soil sample containing undesirable contaminants into fractions, and analyzing the resulting fractions to determine the presence of the undesirable contaminants therein corresponding to the separated fractions. The fractions containing principal portions of the contaminants at the site are thereafter isolated and removed, and the remaining fractions may be returned to the site for reconstitution.

The system of the present invention utilizes multiple components arranged in an optimized configuration depending on soil type and condition to separate the contaminated soil for remediation into various fractions based on size (e.g., coarse, fine) and/or density (e.g., high density, intermediate density, low density). The separation can further be made incorporating other physical separation methods including magnetic separation and conductivity separation to further maximize the isolation of the contaminants.

The term "contaminant" as used herein is intended to encompass any foreign solid material including chemical, biological and/or radioactive agents introduced into the soil environment such as soil and remains present in sufficient amounts to pose health hazards and reduction in the quality of life to people and animals. Such contaminants may include heavy metals such as copper, lead, mercury, cobalt, cadmium, and the like; radioactive metals such as thorium, uranium and the like; salts; organic wastes; minerals; plastics; and the like.

The present invention has been developed in response to a need for detoxifying small arms firing range soils, but has broader use for detoxifying a range of contaminated soil, particularly metal contaminated soil. According to the U.S. Environmental Protection Agency (EPA) there are well over 4,000 small arms ranges (Department of Defense, private, and public) in the United States.

A typical round of small arms ammunition comprises a bullet, a cartridge case containing propellant, and a primer to ignite the propellant. The bullet may be composed of a solid bare lead alloy, a solid lead alloy with an outer metal jacket, a solid lead alloy with a steel penetrator tip, or a lead alloy core with a depleted uranium cover (i.e., armor piercing); they also may be filled, special purpose bullets.

The major component of most solid bullets is a lead alloy with antimony added to increase hardness and improve other properties. Traces of copper or tin also may be present in the lead alloy as impurities. The outer metal jacket usually is a thin layer of copper alloy. Arsenic may be present as a contaminant at ranges where shotguns are used, because about 2% arsenic is present in lead alloy to improve the roundness of the shot. Moreover, tracer munitions may be used which provides an effective means of determining the direction of fire for rapid-firing small arms. When used in machine guns, tracers are loaded into the feed belt in a predetermined sequence. Such tracers generally contain fill composed of strontium compounds and/or magnesium metal.

In addition to the bullet, the primer may be a further potential source of metals contamination. Commercial primer compounds for small-arms ammunition are generally composed of mixtures of lead styphnate and barium nitrate. Airborne lead particulate from unjacketed bullets fired from a pistol can also be present in high concentrations. Consequently, airborne particulate from primers and unjacketed bullets can contribute to elevated lead levels in soil along the firing line.

Typically, outdoor small-arms ranges are constructed with a firing line, target line, an impact berm or bullet trap, and an overflight area. Long-range rifle and automated ranges may have a low berm in front of the targets to protect spotters or target mechanisms. The distance from the firing line to the target line is normally 50 to 300 feet for basic small-arms ranges and up to 3,000 feet for long-range rifle ranges. Impact berms vary in height from 5 feet to as high as 50 feet. A berm in front of the line of targets may be present at small-arms or long-range rifle ranges. Combat or assault training ranges may have pop-up targets at varying angles and distances in each lane or may require the shooter to move along a trail with pop-up targets. Further details on the design of small-arms ranges can be found in Whiting (1989) and United States Department of Defense (DoD) (1992).

Trap and skeet ranges do not have impact berms. Target disks are discharged at random angles from houses at the sides (skeet shooting) or center (trap shooting) of the range. Firing at the targets results in a generally uniform distribution of shot spanning about 150 degrees (for skeet ranges or combined trap and skeet ranges) or about 95 degrees (for trap ranges) across the front of the firing position for about 300 yards beyond the target house locations (Whiting, 1989).

In one embodiment of the present invention, there is provided a method for removing contaminants from a soil comprising the steps of separating the fractions of the soil based on physical properties or characteristics, evaluating each of the fractions to determine the level of contaminants contained therein, and removing the fractions that contain principal portions of the contaminants and returning the remaining fractions to the soil. In a further embodiment of the present invention, vegetation, which may have contaminants bioaccumulated therein, can be separated and removed from the soil for subsequent processing or disposal.

In a preferred embodiment of the present invention, the soil to be remediated is separated according to particle size into multiple size fractions, and thereafter each size fraction is separated according to particle density into further density fractions.

The method of the present invention generally includes the steps of collecting a sample of soil that is representative of the soil at the site to be remediated. The sample is best collected from various points of the site, and should be proportionate to the amount present at the corresponding point. The samples are processed by separating the soil into constituent parts based on particle size ranging from coarse to fine. The separation process may be carried out by a dry screening process with subsequent wet wash of the coarse material. The fine material that is washed from the coarse material which is retained separate from the remaining fine material to allow the quantity and character of material to be evaluated. Alternatively, the separation process may be carried out by a wet separation method.

The coarse material is thereafter processed into separate fractions based on particle density for groupings in the low density range (e.g., vegetation, plastic, rubber, fiber, wood, and the like), the intermediate density range (e.g., rocks, free mineral grains, silicates and the like), and the high density range (e.g., particulate metal, iron, lead, copper, zinc, and alloys thereof, dense mineral grains, rutile, oxidized metals, zircon, and the like). The remaining non-coarse material is further separated by size into a suitable number of size range fractions to facilitate and enhance proper density treatment. Each size range material produced in this step is subsequently subjected to a separation into at least three density fractions. Once all size and density fractions are obtained, each fraction is weighed as dry material.

Each of the fractions is then analyzed for the contaminants (i.e., lead) to determine the content of the contaminant therein. Such analysis can be implemented using commercially available soil diagnostic testing and sampling kits as known to one of ordinary skill in the art. An evaluation of the contaminant distribution is accordingly made with respect to the site criteria. The analysis of the distribution of the contaminants allows a determination to be made on the feasibility of generating a portion of the site material to be at least substantially free of the contaminants of interest. The analysis provides details as to the quantity and character of the contaminated portions of the material useful for implementing treatment options.

The weight (mass) of the material in a given fraction is multiplied by the concentration of the contaminant (i.e., lead) in that fraction, and the resulting mass of the contaminant is summed from each fraction produced. The cumulative mass of the contaminant is divided by the cumulative mass of the material in the sample based on the particular size range to determine the contaminant concentration in the cumulative material within the particular size range. The contaminant concentration is compared to the desired cleanup criteria for the site, and a clean material size range is known and determined.

The cumulative material is generally composed of the coarser to the finer fractions. The cumulative contaminant concentration for each of the corresponding density fractions can also be determined. Based on the evaluation, the most beneficial scenario for material return to the site can be determined. From the residual materials, a total contamination content can also be determined for various combinations of fractions. Although the residual leachability cannot be determined from the characteristics of the individual fractions, the suitable fractions can be reconstituted to measure and determine the corresponding composite leach characteristics.

When the material evaluation is complete, the size and density fractions that need to be separated to produce acceptable soil is known, and a full scale plant configuration can be optimized therefrom.

Referring to FIG. 1, a system 100 for removing contaminants from soil is shown for one embodiment of the present invention. The system 100 comprises a soil feeder or feed/surge bin 2 in the form of a Balzer 13'×9' steel feed hopper with a 5 hp electric (440 volt 3 phase) motor and 12 cubic yard hopper capacity. The motor is equipped with a speed reduction drive, and a variable ratio pulley system for adjusting the feeder belt speed. There is also a variable height discharge gate that can be used to control feed rate of material out of the hopper. Material is brought to the plant by truck and/or loader and placed into the soil feeder bin 2 by the loader. The discharge rate is adjusted to balance plant operation. A discharge belt that is part of the soil feeder 2 places material onto a 60-foot long conveyor 4 powered by a 2-hp. electric motor, and is equipped with a Milltronics belt scale. The belt scale uses load cells to monitor weight on the belt 4 and provides instantaneous readout of conveyor material load and integrates to provide the total plant feed between each resetting of the soil feeder 2.

There is need for removal of tramp steel and other materials possessing magnetic properties, which is done most beneficially prior to the material entering the wet portion of the plant. A cross belt electromagnet or permanent magnet combined with a powered conveyor 3 that drags the magnetic material off the magnet and into a catch bin 5 is used. At some sites, there appears to be no need for this, but the chance of a stray piece of steel or of a material not anticipated from site assessment might enter the plant and jam or break a component, is not a risk to take. Also, debris four inches or greater is transported from soil feeder 2 via conveyor 1 to a bin 61, or alternatively via gravity dump as indicated by the phantom arrow directly from soil feeder 2 to bin 61.

This conveyor discharges into a Goodfellow three deck screening plant 6 with an integral sandscrew 28 located below the screens, with a 60 hp motor powering the screening plant 6 and a 15 hp motor powering the sandscrew 28. The screen aperture can be altered by exchange of the screens. The sandscrew fines cut point can be changed by the flow rate of the wash water 38 fed to the sandscrew portion of the wash plant. The sandscrew coarse discharge 55 can go directly to conveyor 29 for subsequent processing in a pug mill 18 (such as stabilization or leaching) or directly via a conveyor 33 to output stockpile 31. A conveyor 35 is used to transfer reagent from reagent feed 86 to the coarse discharge 55 on conveyor 29. A suitable reagent is marketed as APATITE II, however any suitable reagents that facilitate metal stabilization in soils including those capable of rendering lead insoluble in the presence of the test solutions mandated by the Environmental Protection Agency can also be used. The output from pug mill 18 consists of stabilized −#10+200 mesh and −#200 mesh soil 88, in this example. The fines from the sandscrew 28 overflow a horizontal edge and flow to a Galigher slurry pump 37 with a 30 hp electric (440 V 3 phase) motor, from which the fines are transferred to a Finlay Siltmaster 200 clarifier 24, in this example.

The Finlay Siltmaster 200 clarifier 24 comprises a feed trough where material that has been mixed with a flocculant and the formed aggregate of fine material will immediately settle, and fines will flow to the far end from the overflow growing in size by aggregation. A cylindrical form spiral blade 25 rotates on axis and drags settled material from the overflow end to the opposite end where a bucket wheel 27 picks up the settled material and dumps it through a chute to a tank 41 for feed by a pump 43 to a belt press 14. Both operations on the Finlay clarifier 24 are powered by a 10 horsepower electric motor driven hydraulic pump driving hydraulic motors on each of the scroll and bucket wheel.

The belt press 14 is used to dewater the fines. Water 38 can be added from a water treatment subsystem 90, if needed to optimize the formation of particles from reaction with added flocculant, prior to feed going to the belt press 14. Note that a water storage tank 22 delivers water to the water treatment system 90, and to the soil organic matter storage bin 92.

The belt press 14 is a 3-meter belt press manufactured by Bright Technologies. There are multiple motors powering the operation of this unit. The belts are driven by a total of 36.5 hp from various 440 V electric motors. The speed is adjustable through a variable frequency drive unit. The belts carry the material through a series of pinch rollers (not shown) that squeeze the free water out of the material in stages. The final discharge is a cake of material that has minimal water and is capable of being stacked. There is also a flocculant addition pump 47. The latter delivers a premixed flocculant 45 to the feed material to allow it to gather and separate from the water which provides the mechanism for reducing the water content of the produced fines.

Flocculants are commonly used to facilitate the removal by filtration of particles of impurity from a liquid which otherwise may be too fine to settle. A suitable flocculant is an acrylic acid/sodium acrylate copolymer marketed as hyChem AF 308, however any suitable flocculant capable of causing particles in a colloidal dispersion to clump together including those composed primarily of acrylate polymers can also be used. Recovered water 38 flows to a Sala vertical shaft slurry pump (not shown) and is directed back to the Finley clarifier 24 for recovery of any fines lost by the belt press 14.

Clear water 51 from the Finlay clarifier 24 flows out to a storage tank 22 that provides surge capacity and storage. The storage tank 22 also contains all water not retained in other vessels at shut down. A significant benefit to the plant configuration is no water discharge from the plant 100 during operation, and water is disposed of only at completion of site operations. Clear water 53 also flows from belt press 14 to storage tank 22. A pump 232 pumps water from water storage tank 22 to water treatment 90. Note that tie points 94 provide water 38 flow from clean water treatment subsystem 90 to other portions of the present soil contaminant removal system.

Fines discharged from the belt press 14 can be mixed with other fractions from the sandscrew 28 to provide soil for return to site, or can be stabilized separately, leached or disposed of as site, state, federal or other constraints dictate.

Coarse material from the sandscrew 28 is typically sent to the plant discharge directly, as indicated, but can alternatively be pumped via pump 55 with added water 38 to a density treatment 53 to remove dense fragments from this material. The soil at some locations will have recoverable dense material in this size fraction, and may require treatment to meet site goals or requirements.

The larger sized material, such as −4 inch×to +1 inch, from the screen plant system 6 can be run out separately via conveyor 57 to bin 59, or can be combined for further processing steps. In either case transport is accomplished by conveyor belt and material discharged to the next stage. Typically at least one fraction of material less than one inch to #10 mesh from the screen plant system 6 will next be conveyed via conveyor 63 to density treatment 53, where the densest material is removed from the rest in a mineral jig. The densest material can include metals, such as lead or uranium, or other dense materials.

The density treatment system 53 includes a 42-inch diameter circular jig with a center feed and perimeter discharge. A suitable jig is a 48-inch circular jig manufactured by Goldfield Engineering of Linden Utah. It is powered by a 2 hp 440V 3 phase electric motor running through a speed reduction to an offset cam that works a bottom, cone shaped portion of the unit that is connected by a flexible seal to the upper truncated cone (which transitions to a cylindrical shape) vessel, by means of a drive that lifts the cone and drops it in a sinusoidal manner.

The cone travels up and pushes all water in the hutch of the jig up through the bed of material lofting the entire bed, and then drops allowing the material to settle, with denser settling faster than the rest. Water 38 is fed to the density treatment system 53 as the bottom cone drops so that there is no suction action, but only the gravitational settling of particles. The entire feed material is placed into the center of the jig by a feed well, and the pulsation moves the non dense material across the jig bed to the perimeter by the pressure created by the buildup of material at the center, and the dense material settles through the material to the bottom layer in the jig, or on through a support screen to discharge out the bottom of the cone. The screen in the bottom of the jig is also conically shaped and the apex is oriented towards the ground. This arrangement allows the dense material to build and settle to the center without affecting the performance of the jig. For the sake of simplicity, the aforesaid density treatment system 53 components are not shown.

There are two jigs in parallel, so that one can be shut down and built up material removed while the other jig continues to work. Both jigs discharge less dense (Vegetation and rock) material to a common launder that transfers the material to a sandscrew (not shown) for further separation and dewatering. The least dense material (Vegetation/wood) can be dewatered and staged for disposal (as in the case of highly contaminated vegetation) or placed to a conveyor for further processing, blending or removal to disposal stockpile or return to site stockpile bin 65 from density treatment system 53. The mixed non-dense material (Vegetation and Rock) from this stage can be separated by a sandscrew by control of the upflow wash water, which will loft the least dense material (vegetation) from the mid dense material.

The material is typically treated in multiple size ranges but can be combined to treat as a single size range material, depending on the nature of the material, the contamination and ability of separating process.

The recovered dense material from the density treatment system 53, above the screen in the jig is removed by one of three different methods. The first being the manual removal by means of a shovel, scoop or other device that allows the operator to reach to the bottom of the jig bed and remove some portion of the built up material. This process is continuously used by the operator to determine jig loading, whether it is the prime means of removal or not. For most applications this is too inefficient, whereby a powered process is required. One such method is an eductor (not shown) that uses water flow through a constriction that produces a suction to which another hose is connected. This other hose has sufficient suction to draw dense material from the bottom of the jig or density treatment system 53, from which it is discharged to a dewatering screen 67 that hangs above a water drain 69, and the screened solids are dropped into a storage device 71 such as a super sac.

The amount of material placed into supersacks is less than the volume available as the weight limit of it is the restriction. The removal is performed intermittently so as to provide continuous operation of the jig circuit. A third way of discharging material is the use of "draw offs" that allow the pulsing action of the bed to lift dense material over a trap and allow it to fall into a collection device. These discharge methods can be implemented on any of the sized material so produced.

The mixed density material 73 that is discharged from the jig process is sent to a sandscrew 74 where the least dense material can be lifted from the rest by upflow of water in the sandscrew 74. The low density material 75 is dewatered by a simple screen 77, and the mid density mineral material 81 is dewatered by draining in the neck of the sandscrew 74 and discharged to bins 79, 83, respectively, or to individual conveyors or stockpiles (not shown).

At this point in the processing all material is sized by a mechanical aperture (not shown), and some material also by a subsequent hydraulic characteristics. Following the size separation the materials are separated by density into various fractions. A lab analysis is made of the material to determine which portions are suitable to remain on the site and those which must be recycled or disposed of as waste or hazardous waste. The optimization of the materials to produce the minimum amount of waste and hazardous waste is the goal and is achievable in many applications of the invention.

All plant or system components are wired through a central control panel 85 that provides for immediate shut off of power to all components for emergency conditions. A portable electric generator 87 provides power to the components of the system. All of the components have individual start and stop controls (not shown) for the systematic start up and shut down of the plant. The typical operation is to power up components in a sequence that allows for an absence of material surging to any one component, and the sequential transfer of material from one component to another. The balance of plant operation is continuous to adjust to variation in feed material from the stockpile. If a stockpile of material can be blended from a source area to provide a more consistent feed, adjustment is minimal.

In order to deal with the variable nature of small arms firing range soil conditions and contamination, for example, the plant and process of the invention have a high degree of built in flexibility. Process components include:
  Wet scrubbers/screens for dust-free de-agglomeration and sizing;
  Multi-stage coarse and fine gravity separations for particulate lead recovery and refinement for recycling;
  Compact, high capacity mobile plant modules designed to be moved and easily reconfigured from site to site; and
  Closed-loop, water-based processing with spill controls eliminates airborne lead dust, while minimizing the volume of process water required.

Utilizing density separation techniques developed primarily for the gold mining industry, physical treatment recovers particulate metal and unspent ammunition. The removal of the particulate metal results in a dramatic reduction in both total and leachable levels for the heavy metals most commonly involved with munitions, which typically include lead, zinc, copper and antimony.

Physical treatment also partitions the residual organic or sorbed contaminants from the larger soil grains into the organic matter and/or fine soil fraction. For sites where the soil contains appreciable amounts of rock, gravel, and sand, physical treatment can significantly reduce the overall volume of soil requiring more expensive residual treatment and/or disposal for these sorbed contaminants, thereby reducing total project cost. And since contaminants are physically removed, long term monitoring and associated liabilities are eliminated.

The invention uses placer mineral processing techniques and procedures to recover particulate contaminants as refined "products." The operation is dust free, and in the case of ranges, the recovered metal is "scrap metal" per 40 CFR 261.1(c)(6). Under this citation, scrap metal is classified as a "recyclable material" that is not regulated or manifested.

As discussed, the invention consists of unit components whose selection is site-specific. The variability in unit components, scale, and soil characteristics thus result in there being no one set process to which exact units, water and material flow rates can be applied. The invention is site-specific and as such, the equipment array and corresponding water and material flows are variable.

Treatment System:

While the concept of particle separation is over 100 years old, the present inventors pioneered its application for remediating metals-impacted soils. The process relies upon the refinement and reconfiguration of the components to provide higher throughputs from a physically smaller transportable plant. A description of each processing step follows.

Physical Sizing—The physical sizing process uses sequential wet screening 6 steps, the first of which is deagglomeration. Wet screening 6 provides dust-free operation and sharp particle-size fraction separation (cut) points. For each screening step, "plus" and "minus" fractions are generated, with actual cut points based on the treatability study data. The goal of wet screening is to partition the particulate metal contamination into narrow size fractions to facilitate effective gravity separation and to partition the soil particles with organic contaminants into the smallest size fraction for subsequent classification.

Soil Classification/Attrition—Sand screws are used to classify sand and gravel fractions by scrubbing contaminant coatings off the particle surfaces and segregating the contaminant-bearing organic matter (vegetation) and soil fines from the clean sand and gravel fractions. The goal of classification/attrition is to minimize the volume of material requiring subsequent treatment while maximizing the output of clean soil fractions. With sand screws, such as 28 and 74, water flow coupled with screw rotational speed determines the level of attrition scrubbing and subsequent particle size of the fines fraction that is removed from the clean sand fraction.

Gravity Separation—When particulate contaminants are the same size as the surrounding soil particles, gravity separation/density treatment, such as 53, is used to remove the particulates from the same-sized soil matrix. For a typical soil matrix, particulate contaminants usually consist of vegetation (specific gravity of 0.8 to 1.2) and metals (specific gravity of 8 or more based on metals present). With a specific gravity of 2.5 to 3.5 for typical soil fractions, the particulate contaminants, which are lighter and/or heavier than the same-sized soil particles, are easily separated using mining-based density separation techniques of elutriation and jigging.

Elutriation and jigging are used for vegetation/soil fines removal and gross particulate removal, respectively. Elutriation uses water flow over weirs to separate the lighter vegetation and soil fines from heavier/larger sand particles. Jigging uses differential settling in water to separate heavy metal particles from lighter, sand/gravel particles of the same size.

Magnetic Separation—To recover ferrous metal components, self-cleaning magnets are used. They are suspended over the intermediate product conveyors, (such as 3), and automatically remove potentially contaminated tramp iron and other ferrous metals from the product stream after the initial high-pressure wash, depositing the ferrous metal in a bin for subsequent recycling. This ensures that the treated soil is free of any magnetic material.

Dewatering/Water Treatment 90—To reduce water consumption, process water 38 is recycled within the plant. A clarifier and dewatering screen are used in series to segregate/dewater heavy vegetation and condition the fines-slurry for subsequent dewatering using a belt filter press. Sand and carbon filtration follows as a polishing step for final rinse spray bars. This enables a counter-current reuse of process waters while minimizing water consumption and associated disposal costs.

Vegetation Removal—A static vegetation removal screen is incorporated after each classification/elutriation step to recover the "floatable" vegetation in the aqueous stream. All of the recovered vegetation is containerized in a bin 92, for example, for subsequent treatment and/or disposal.

Stabilization—A chemical addition stage (flocculant 39 and/or premixed flocculant 45) incorporates a benign chemical that inhibits the solubility of lead and other heavy metals from the treated soil. Stabilization chemical selection is based on test results and also on the projected use of the soil in the future. The stabilization chemical may be soluble or may be added as an insoluble form to provide long term mitigation against leachability.

Oxidation/Reduction—A chemical addition stage incorporates a chemical (or combination of chemicals) that is capable of destroying the organic constituent that renders the material hazardous. This is accomplished either in the process stream or after discharge from the plant into appropriately sized stockpiles or windrows. The chemical addition may be a single application or may be multiple applications to obtain the desired degree of destruction. The addition may also include chemicals that are insoluble in the process solution (zero valence iron, i.e. iron fillings).

Microbial Remediation—Optionally the process of the invention can include microbial decontamination in the case the soil contains contaminants susceptible to microbial degradation, such as hydrocarbons (oil spills), chlorinated hydrocarbons such as TCE, pesticides and the like. In such case a suitable microbial culture of indigenous or non-indigenous microbes, with or without added microbial nutrients, can be introduced with suitable integration into the separate soil fractions after dewatering and prior to storing before returning to its original site. The microorganisms selected for degrading the polluting substances in the soil are chosen from known commercially available strains, for example, it is well known that strains of the *Methano arina* genus, an *Actobacterium* genus and an *Agrobacterium* genus degrade chlorinated hydrocarbons such as tetrachloroethylene, perchloroethylene and carbon tetrachloride and the like. The microorganism can be known strain or obtained by enrichment culture of field sample using the pollutants present in the soil in question or genetically modified to improve their pollutant degrading ability. The microorganism can be isolated and identified or used as unidentified strains or as mixed culture.

EXAMPLE

Example of Small Arms Firing Range Decontamination:

The overall objective of the trial was to determine the optimal individual components for particle separation and stabilization, and to demonstrate and validate the environmental acceptability of the soil treatment sequence by treating a minimum of 7,500 tons of lead contaminated soil taken from a military range in an environmentally acceptable and cost effective way.

Samples were collected and treatability study was conducted. The study was designed to determine whether the process of the invention would be successful in treating lead-impacted soils from the military range which was in active use for many years. The objectives of the study were as follows.

Develop a soil washing process and plant configuration that optimized reduction of lead concentrations in soil to less than 400 mg/kg.

Determine the optimal stabilization treatment for soil fractions that exceeded the total lead requirement after soil washing. After stabilization, the soils had to meet the TCLP (Toxic Characteristic Leaching Procedure) regulatory concentration for lead of 5.0 mg/L. The preferred treatment would meet a goal of TCLP lead concentration of 0.75 mg/L.

To perform the study, soil samples were collected and composited from each of four locations at the range, the right face, left side, back, and floor. A fifth location, the lateral was not sampled, as these soils comprise only 2% of the total range soil volume. Composited soil from each location was characterized for particle size distribution and concentrations of lead, the chief contaminant of concern. In this process, the soil was segregated into several fractions based on the size of the soil particles using a wet sieving process. The particulate metal and organic matter in the soil were then segregated from the resulting soil fractions using a density separation process. Each soil, particulate, and organic matter fraction was then analyzed for lead. Soils and soil organic matter from the right face and range floor were also analyzed for copper and antimony, to represent the worst and best cases for metal contamination.

The results of the treatability study are included as Table 1. The optimized approach involved treating the left side, back, floor, and lateral berm soil as a "composite feed" source, with the right face soil treated as a second discrete feed source. Using this approach, only the right face soil required stabilization. The optimized process flow diagram is depicted in FIG. 1.

The process equipment was mobilized to the site and set up in a fenced treatment compound within the bounds of the range. Components were assembled per the optimized process flow diagram, FIG. 1, and tested. Once assembly was completed, the system was tested as a whole and minor modifications were made in the field to further optimize the process. A sample preparation and field testing laboratory were also set up within the fenced-in treatment compound.

The range floor, left berm face, back of berm, and lateral berm soils were excavated and homogenized as the composite feed source soil. The right berm face was excavated and homogenized as the right face feed source soil. Each of the two feed soils were maintained and processed separately, with the composite soil processed first, followed by the right face feed soil. Table 1 includes the initial summary of the projected soil volumes by source area.

TABLE 1

Approximate Soil Volume by Feed Soil Source Area

| Feed | Section | Cut Feet | Volume Cubic Yards | Weight Tones | % Total |
|---|---|---|---|---|---|
| Composite Feed Soil | Range Floor | Varied | 2,184 | 3,058 | 41% |
|  | Left Face | 1.5 | 651 | 911 | 12% |
|  | Back Face | 1.0 | 1,086 | 1,520 | 20% |
|  | Right Lateral | 1.0 | 133 | 186 | 3% |
|  | Total Composite Soil |  | 5,676 |  | 76% |
| Right Face Feed Soil | Right Face | 3.0 | 1,303 | 1,824 | 24% |
|  | Total Right Face Soil |  | 5,357 | 7,500 | 100% |

Following excavation, the soil was processed through the optimized particle separation plant as shown in FIG. 1, composite soil first, followed by right face soil. For soil with excessive oversize/debris, a scalping grizzly was used as a pretreatment step to remove the 4" and larger rocks/debris.

Figure 2:
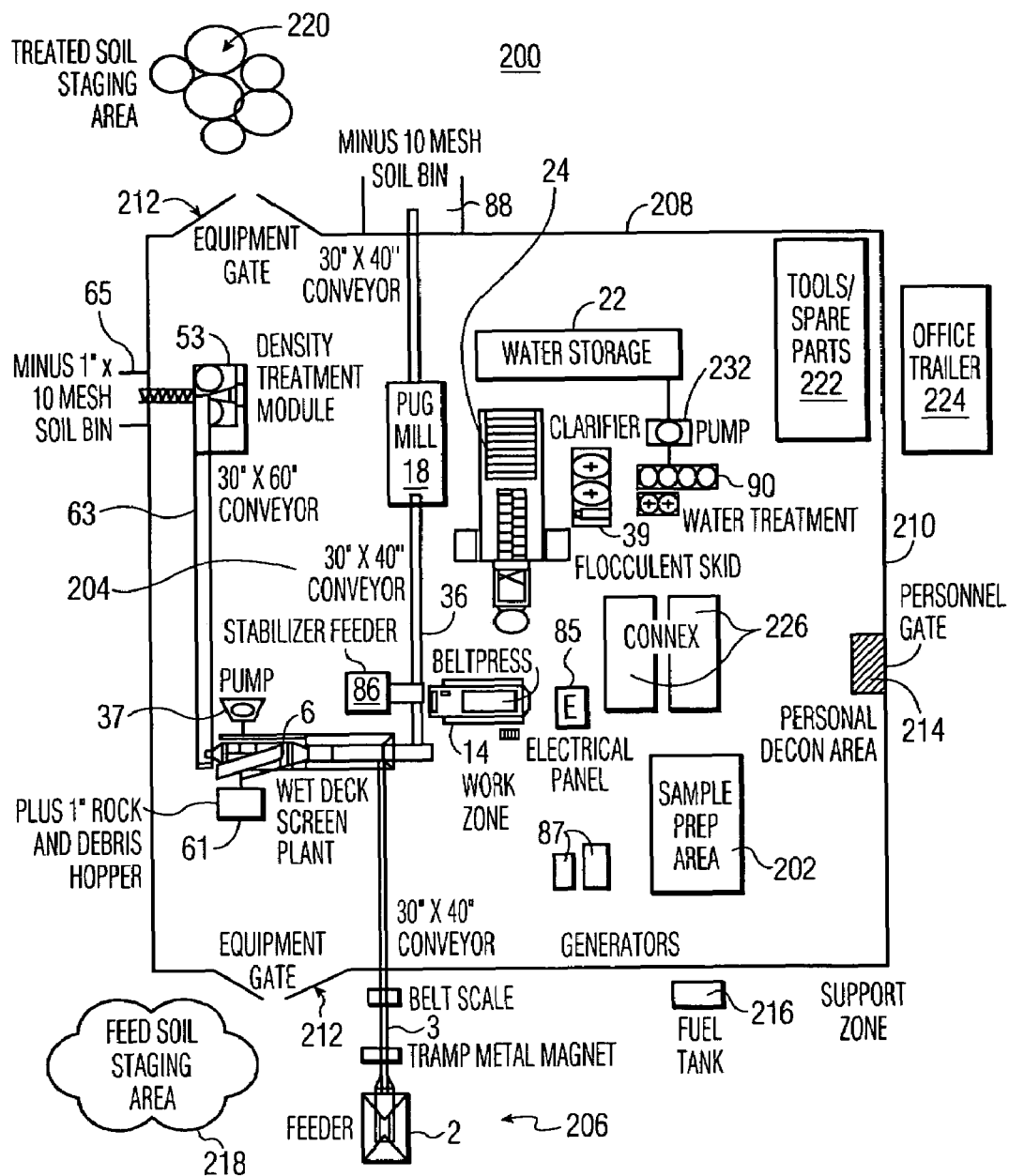
FIG. 2 is a block diagram showing a site layout for one embodiment of the invention.

In FIG. 2, a soil processing system 200 is shown as installed at a specific site, for one embodiment of the invention. Other sites may have a different arrangement between the various system components. Note that in addition to the various equipment and components of the site as described elsewhere herein, in this example, the site also includes a security fence 210, equipment gates 212, personal gate 214, fuel tank 216, a feed soil staging area 218, a treated soil staging area 220, a tool and spare parts shed 222, an office trailer 224, and a connex 226 that provides two weatherproof storage boxes. Also in this example, the site occupies an area of about 120 feet by 160 feet.

The metal concentrate was loaded into 1-ton supersacks. Palletized supersacks containing separated metals were stored in the treatment compound. The filled one-ton supersacks, containing dewatered particulate metals, were staged in orderly rows. Each bag was marked with a discrete tracking number, date filled, and weight, and was subsequently sampled. A summary of the metal removed by day is shown in Table 2.

Upon conclusion of the physical treatment phase, the supersacks were transported to Exide Battery Company in Reading, Pa. for recycling in accordance with applicable local, state, and federal laws and regulations.

TABLE 2

Total Removed Metal by Day

| Operating Day | Pounds | % Metal |
|---|---|---|
| 1 | 2100 | 98.1 |
| 2 | 1700 | 95.0 |
| 3 | 2200 | — |
| 4 | 2200 | — |
| 5 | 2200 | 97.0 |
| 6 | 2150 | — |
| 7 | 2400 | — |
| 8 | 2100 | 95.0 |
| 9 | 1850 | — |
| 10 | 2200 | 98.6 |
| Total | 21100 | — |

Quality Control sampling and analytical testing included both air monitoring and soil testing. The initial sample locations and frequency for air monitoring is shown in Table 3.

Air monitoring was performed to ensure that personnel are not over-exposed to airborne lead above the OSHA PEL of 50 ug/m3 averaged over an 8-hour work shift, and to verify that no airborne lead left the work area. The purpose of the air monitoring was to assess the total concentration of lead particles that the workers had the potential to be exposed to during the trials. Breathing zone air monitoring in and around the soil excavation, sample preparation operations, and processing operations were conducted during the first week of processing using personal air pumps and pre-loaded cassettes with filter media for analysis of airborne lead, with analyses of the filter media on a rush turnaround basis. Air monitoring was then conducted once per week for the duration of the trial.

PAS-2000 Personal Air Samplers were placed in four different areas; the sample preparation area 202; the soil processing area 204; the soil feed area 206; and the perimeter 208 around the site for an 8 hour time period. Personal air sampling was conducted for lead in accordance with NIOSH method 7300. This method involves collection of an air sample using a personal sampling pump and a mixed cellulose ester filter. The air sampling plan is shown in Table 3.

TABLE 3

| Total Processing Days - Particle Separation - 30 Days; Stabilization - Concurrent with Last 7 Days of Particle Separation; Daily sampling first week, weekly for duration of processing | | Total Metals (Pb) | |
|---|---|---|---|
| | | Rush TAT | Standard TAT |
| Processing Area | Personnel | 5 | 4 |
| Excavation Area | Personnel | 5 | 4 |
| Sample Preparation Area | Stationary | 5 | 4 |
| Perimeter Downwind | Stationary | 5 | 4 |
| Field QC Sample - One per 10 Samples | Field Blank | 2 | 2 |

The samples were analyzed using inductively coupled argon plasma atomic emission spectroscopy by an American Industrial Hygiene Association-accredited laboratory. Table 4 summarizes the lead air sample results for the four different areas. As evidenced by the data, all readings were below detection limit for airborne lead. This monitoring was supplemented with a real-time MINI-RAM direct reading particulate meter on a daily basis during sample prep operations. Dust concentrations were recorded on an air monitoring data log sheet as shown in Table 5.

TABLE 4

Lead Air Sample Results (mg/m$^3$)

| Sample Day | Sample Prep Area | Process Area | Soil Feed Area | Perimeter |
|---|---|---|---|---|
| 1 | <0.0028 | <0.0028 | <0.0028 | <0.0028 |
| 2 | <0.0028 | <0.0028 | <0.0028 | <0.0028 |
| 3 | <0.0028 | <0.0028 | <0.0028 | <0.0028 |
| 4 | <0.0042 | <0.0042 | <0.0043 | <0.0043 |
| 5 | <0.0029 | <0.0031 | <0.0031 | <0.0031 |
| 6 | <0.0029 | <0.0029 | <0.0029 | <0.0029 |
| 7 | <0.0027 | <0.0027 | <0.0027 | <0.0027 |
| 8 | <0.0027 | <0.0027 | <0.0027 | <0.0027 |
| 9 | <0.0030 | <0.0030 | <0.0030 | <0.0030 |
| 10 | <0.0031 | <0.0031 | <0.0031 | pump broke |

Notes:
PAS-2000 Personal Air Sampler
All concentrations were Below Detection Limit (BDL)
Analyses were performed in accordance with NIOSH 7082

TABLE 5

Daily MiniRam/Dust Log

| Sample Day | TWA (mg/m$^3$) |
|---|---|
| 1 | 0.018 |
| 2 | 0.030 |
| 3 | 0.000 |
| 4 | 0.036 |
| 5 | 0.048 |
| 6 | 0.031 |
| 7 | 0.000 |
| 8 | 0.037 |
| 9 | 0.016 |
| 10 | 0.006 |
| 11 | 0.033 |
| 12 | 0.026 |
| 13 | 0.074 |
| 14 | 0.018 |
| 15 | 0.020 |
| 16 | 0.039 |
| 17 | 0.042 |
| 18 | 0.013 |
| 19 | 0.015 |
| 20 | 0.023 |
| 21 | 0.020 |
| 22 | 0.022 |
| 23 | 0.025 |
| 24 | 0.056 |
| 25 | 0.050 |
| 26 | 0.045 |
| 27 | 0.015 |
| 28 | 0.008 |
| 29 | 0.014 |
| 30 | 0.018 |
| 31 | 0.035 |
| 32 | 0.079 |
| 33 | 0.100 |
| 34 | 0.047 |
| 35 | 0.019 |
| 36 | 0.033 |
| 37 | 0.033 |
| 38 | 0.036 |
| 39 | 0.005 |
| 40 | 0.010 |
| 41 | 0.003 |
| 42 | 0.008 |
| 43 | 0.005 |
| 44 | 0.004 |

Notes:
TWA—Time weighted average
MIE personal Data RAM, Model PDR-1000AN

Soil Sampling Activities:

The particle separation plant generated the following output streams that required QA/QC sampling and analysis:

Minus 1" by plus #10 mesh gravel (SP-2;)

Minus #10 mesh soil (SP-3), and (stabilized SP-4);

Soil Organic matter (SP-5); and

Metal for Recycle (SP-6).

In addition, the feed soil (SP-1) input streams required QA/QC sampling and analysis. Feed soil sampling consisted of taking composite grab samples from the feed soil pile (SP-1) during the first three days of processing from each source area. At the end of the three days, the material was transferred to a portable cement mixer, which was turned on for 15 minutes and the material mixed. Source area sample results are summarized in Table 6.

TABLE 6

Sample Point 1 - Feed Soil

| | | Sample Designation | | | |
|---|---|---|---|---|---|
| Lead | Antimony | Copper | TOC | TCLP Pb | Percent Moisture |
| | | Analytical Method (mg/kg) | | | |
| 6010B | 6010B | 6010B | 6010B | 200.7 | 200.7 |
| | | | Units | | |
| mg/kg | mg/kg | mg/kg | mg/kg | mg/L | % |
| SP-1-01 | 54.8 | ND | 7.3 | 1,040 | 1.1 | 3.7 |
| SP-1-02 | 1,180 | 11.9 | 30.4 | 972 | 27.2 | 4.7 |
| SP-1-02-dup | — | — | — | — | 31.2 | — |

Soil output piles SP-2 (minus 1" by plus #10 mesh gravel); SP-3 (minus #10 mesh soil); and SP-4 (stabilized minus #10 mesh soil) were collected throughout the course of daily processing in the same fashion. Approximately every three to four hours, a minimum of four shovels of well-mixed soil was taken from the treated soil stockpiles. These samples were placed into wheelbarrows, and transferred to a cement mixer. At the end of each processing day, the mixer was turned on and the material was mixed for approximately 15 minutes.

An adequate sample was taken for direct analyses of parameters such as moisture, TCLP lead, soil gradation, and TOC. Percent moisture was determined for each sample including the process control sample (filter cake from the belt press). Another sample was taken for on-site drying and subsequent pulverizing for total lead, copper, and antimony analysis. The wheelbarrows and cement mixer were decontaminated between samples. SP-2 and SP-3/4 results are summarized in Tables 7 and 8 respectively, with process control sample results summarized in Table 9.

Grab samples of the recovered soil vegetation and humates (SP-5) recovered by the particle separation process were collected once per week for total lead, TCLP lead, copper, and antimony analysis. Metals for recycling (SP-6) were collected once per week and homogenized for on-site testing. A summary of the SP-5 sample results is shown in Table 10 below.

TABLE 7

Sample Point 2 - Minus 1" by Plus #10 Mesh Gravel Stockpile

| | Sample Designation | | | |
|---|---|---|---|---|
| Lead | Antimony | Copper | Percent |
| | Analytical Method | | |
| 6010B | 6010B | 6010B | Moisture |
| | | Units | |
| Mg/kg | mg/kg | mg/kg | % |

Composite Stockpile

| | Lead | Antimony | Copper | Percent Moisture |
|---|---|---|---|---|
| SP-2-01 | 82.4 | ND | 4.8 | 0.3 |
| SP-2-02 | 95.0 | ND | 25.1 | 0.0 |
| SP-2-03 | 56.6 | ND | 7.7 | 4.9 |
| SP-2-(04-07) | 40.2 | ND | 2.9 | 3.3 |
| SP-2-(08-13) | 38.6 | ND | 17.9 | 2.8 |
| SP-2-(14-16) | 83.0 | ND | 8.3 | 2.0 |

TABLE 7-continued

Sample Point 2 - Minus 1" by Plus #10 Mesh Gravel Stockpile

| | Sample Designation | | | |
|---|---|---|---|---|
| Lead | Antimony | Copper | Percent |
| | Analytical Method | | |
| 6010B | 6010B | 6010B | Moisture |
| | | Units | |
| Mg/kg | mg/kg | mg/kg | % |

Right Face Berm Stockpile

| | Lead | Antimony | Copper | Percent Moisture |
|---|---|---|---|---|
| SP-2-01 | 102.0 | ND | 61.8 | 2.6 |
| SP-2-02 | 267.0 | 2.5 | 41.0 | 5.2 |
| SP-2-03 | 53.8* | ND* | 12* | 2.3 |
| SP-2-04 | 141.0 | 1.1 | 19.8 | 4.8 |

Notes:
*SP-2-03 was resampled due to an anomaly found in the original sample causing the concentration to spike.

TABLE 8

Sample Points 3 and 4 - Minus #10 Mesh Soil Stockpile

| | Sample Designation | | | | |
|---|---|---|---|---|---|
| Lead | Antimony | Copper | TCLP Pb | Percent |
| | Analytical Method | | | |
| 6010B | 6010B | 6010B | 200.7 | Moisture |
| | | Units | | |
| mg/kg | mg/kg | mg/kg | mg/L | % |

Composite Stockpile

| | Lead | Antimony | Copper | TCLP Pb | Percent Moisture |
|---|---|---|---|---|---|
| SP-3-01 | 65.1 | ND | 4.1 | — | 0.5 |
| SP-3-02 | 102 | ND | 6.5 | — | 2.3 |
| SP-3-03 | 50.9 | ND | 6.4 | — | 9.4 |
| SP-3-04 | 95.9 | ND | 9.5 | — | 12.9 |
| SP-3-05 | 60.9 | ND | 4.7 | — | 13.2 |
| SP-3-06 | 50.9 | ND | 4.9 | — | 15.3 |
| SP-3-07 | 38.1 | ND | 5.0 | — | 12.5 |
| SP-3-08 | 88.3 | 1.1 | 6.1 | — | 14.1 |
| SP-3-09 | 158 | 1.5 | 8.3 | — | 15.3 |
| SP-3-09-dup | 193* | ND | 8.4* | — | — |
| SP-3-10 | 167 | 1.7 | 11.5 | — | 16.9 |
| SP-3-11 | 187 | ND | 10.0 | — | 17.5 |
| SP-3-12 | 181 | ND | 11.7 | — | 9.6 |
| SP-3-13 | 99.5 | ND | 7.3 | — | 15.7 |
| SP-3-13-dup | 96 | ND | 7.1 | — | — |
| SP-3-14 | 89.5 | ND | 8.2 | — | 17.3 |
| SP-3-15 | 165 | 0.99 | 8.6 | — | 17.3 |
| SP-3-16 | 105 | ND | 7 | — | 15.0 |

Right Face Berm Stockpile

| | Lead | Antimony | Copper | TCLP Pb | Percent Moisture |
|---|---|---|---|---|---|
| SP-4-01 | 1,750 | 18.6 | 43.7 | 0.32 | 16.8 |
| SP-4-02 | 1,300 | 14.1 | 43.0 | 0.46 | 16.2 |
| SP-4-03 | 443 | 4.8 | 93.7 | 0.07 | 2.3 |
| SP-4-04 | 265 | 2.4 | 13.3 | 0.03 | 4.8 |

Notes:
*SP-3-09-dup was resampled due to an anomaly found in the original sample causing the concentration to spike.

TABLE 9

Percent Moisture on Process Control Samples

| Sample | % Moisture |
|---|---|
| 1 | 31.1 |
| 2 | 25.9 |
| 3 | 31.6 |
| 4 | 36.5 |
| 5 | 37.9 |
| 6 | 32.9 |
| 7 | 37.6 |
| 8 | 44.0 |
| 9 | 38.4 |
| 10 | 30.4 |
| 11 | 30.6 |
| 12 | 26.8 |
| 13 | 35.3 |

TABLE 10

Sample Point 5 - Recovered Organics Stockpile

| | Sample Designation | | | |
|---|---|---|---|---|
| | Lead | Antimony | Copper | TCLP Pb |
| | | Analytical Method | | |
| | 6010B | 6010B | 6010B | 200.7 |
| | | | Units | |
| | mg/kg | mg/kg | mg/kg | mg/L |
| SP-5-01 | 3,640 | 8.3 | 297 | 2.1 |
| SP-5-02 | 3,360 | 9.7 | 134 | 7.5 |
| SP-5-03 | 8,060 | 25.9 | 382 | 1.7 |
| SP-5-04 | 34,900 | 58.0 | 1,100 | 72.4 |
| SP-5-T | — | — | — | 0.13 |

Notes:
SP-5-04 - prestabilization;
SP-5-T - post stabilization

The soil mechanically dewatered as a part of the plant process (see FIG. 1, belt press 14). Process water 38 was recirculated. A 21,000-gallon tank 22 was used to store plant water and serves as the supply for the particle separation process. In this example, the water treatment system 90 set up on-site consisted of a 4-pot sand filter and dual tank carbon unit. Makeup water (SP-7) was sampled at the initiation of processing of each new source area. Plant process water (SP-8) was sampled at the initiation of each new source area, and at the completion of processing to confirm dissolved lead levels met discharge criteria. Water sample results are shown in Table 11.

TABLE 11

Water Sample Results

| | Sample Designation | | |
|---|---|---|---|
| | Lead | Antimony | Copper |
| | | Analytical Method | |
| | 200.7 | 200.7 | 200.7 |
| | | Units | |
| | Ug/L | ug/L | ug/L |
| Makeup Water | | | |
| SP-7-01 | 74.4 | ND | 473 |
| SP-7-02 | 4.5 | ND | 4.1 |
| SP-7-03 | 10.0 | ND | 2.7 |

TABLE 11-continued

Water Sample Results

| | Sample Designation | | |
|---|---|---|---|
| | Lead | Antimony | Copper |
| | | Analytical Method | |
| | 200.7 | 200.7 | 200.7 |
| | | Units | |
| | Ug/L | ug/L | ug/L |
| Process Water | | | |
| SP-8-01 | 570 | 9.4 | 58.0 |
| SP-8-02 | 351 | 12.0 | 41.7 |
| SP-8-02-02 | 328 | 13.0 | 37.2 |
| SP-8-03 | 9,240 | 74.1 | 324 |
| Treated Process Water | | | |
| SP-8-T | 14.8 | 36.0 | 7.7 |
| Field Blanks | | | |
| FB093002 | ND | ND | ND |
| FB100102 | ND | ND | ND |
| FB100202 | ND | ND | ND |
| FB100402 | ND | ND | ND |
| FB100702 | ND | ND | ND |

Noise levels throughout the plant were monitored using a Quest Q-300 Noise Dosimeter. Table 12 summarizes the noise level readings from several different areas of the plant.

TABLE 12

Noise Level Readings

| Sample Location | Decibels |
|---|---|
| Sample prep area | 82 |
| | (w/vac running) |
| Motor control center | 76 |
| Cement mixer | 90 |
| Generator | 83 |
| Belt Press | 87 |
| Pug Mill | 84 |
| Wash Plant | 87 |
| Plant Yard | 81 |
| Jig Rig Plant | 86 |
| Fence corner near SP2 | 75 |
| Fence corner near water tank | 72 |
| Fence corner near road | 70 |
| Sand Filter | 73 |
| Clarifier | 77 |
| Decontamination area | 70 |
| SW corner of fence | 71 |
| NW corner of fence | 76 |

Range Restoration:

Concurrent with mobilization the range floor and berm were surveyed and a topographic map was developed. The range floor was then designed to provide a downward slope of 2% from the firing line to the berm toe, with the information overlain on the contour map. The cuts as outlined in Table 2 were also calculated, and used to generate an excavation/grading plan, with corresponding cut/fill stakes placed on transects in the field.

Prior to processing, the range floor and berm faces were excavated and/or graded to plan with the excavated soil stockpiled as either composite or right face feed sources and treated as previously described. Soil organic matter (SP-5) recovered during processing was tested and stabilized as required to pass the TCLP requirement of 5 mg/L as previously described. Once confirming analytical was received, the organic material, along with the oversize fraction, were placed in a berm core below the treated #10 mesh minus fractions (SP-3 and SP-4) as structural fill.

Once confirming analytical was received for the minus #10 mesh treated soil day piles, they were consolidated at the base of the berm for subsequent replacement. The composite source area piles (SP-3) were stockpiled separately from the right face source area piles (SP-4). Only the right face or SP-4 soils received stabilizing agent addition. The treated gravel (SP-2) fraction (minus 1" by plus #10 mesh) was consolidated into a single stockpile near the firing line.

Once processing was completed, the range floor and front berm face were resurveyed, and the cuts/fills required to make final grade were calculated, with cut/fill stakes placed on transects in the field for reference during range restoration. The stabilized or SP-4 soil was used to restore the lateral berm face and the eastern most (or right most, looking from the firing line toward the berm) 14 lanes (lanes 1 through 14) of the berm face. The balance of the berm face was restored using just density treated or SP-3 soil. The respective treated soil was used from the bottom to the top on the berm face, and no treated soil was replaced on the back of the berm or range floor.

The treated gravel or SP-2 fraction was used to construct a pad approximately 10 feet from front to back along the entire length of the firing line. The thickness of the firing line pad averaged 8 inches.

The process gave the following results: (1) the lead concentration in the impact berm soils was reduced to a maximum total soil lead concentration of 400 milligrams/kilogram (mg/kg) which met the applicable cleanup criteria; (2) the impact berm soils that failed to meet residential soil cleanup criteria after particulate lead removal, were stabilized so that the leachable lead content was no greater than five milligrams/liter (5 mg/L) (required) as determined by the Toxicity Characteristic Leaching Procedure (TCLP) (EPA Method 1311).

During processing, all airborne lead levels were below detection limit at all monitoring stations. In addition, the process water treatment was effective in treating process water, and no liquid wastes requiring disposal were generated. All recovered metal exceeded the requisite 90% purity requirement, and was commercially recycled.

In addition to density separation, the treatability study evaluated two stabilization agents—MT2 Ecobond and PIMS NW Apatite II. While each represents a phosphate-based approach to passivating or stabilizing anionic metals, Ecobond is highly soluble and Apatite II is relatively insoluble. As such, one would expect the Ecobond to provide a quicker, real-time stabilization approach, while the Apatite II represents a "time-release" approach.

In all, a total of 7,576 tons of soil were treated. Of that, 5,705 tons of composite soil was reclaimed with density treatment, and 1,871 tons of right face soil required both density treatment and subsequent stabilization. For the composite soil, all of the SP-2 and SP-3 fractions met reuse goals, with total lead levels ranging from 39 mg/kg to 95 mg/kg and 38 mg/kg to 187 mg/kg respectively. For the right face soil, all of the SP-2 and SP-4 fractions met reuse goals with the total lead levels ranging from 54 mg/kg to 267 mg/kg for the SP-2 fraction, and TCLP lead levels ranging from 0.03 mg/L to 0.46 mg/L for the SP-4 fraction.

Noise readings taken during processing confirm the plant is "quiet" perimeter noise level at or below 76 decibels, making it a suitable technology, from a noise standpoint, at virtually any site.

During processing, percent moisture analysis was performed on filter cake exiting the belt filter press to assess performance. The belt press averaged 26% to 35% moisture (74% to 65% solids) in the filter cake.

The soil processing recovered approximately 10.6 tons of lead, 1.9 tons from composite soil and 8.9 from right face soil. The purity of the recovered metals ranged from 95% to 98%. Also recovered was approximately 3 tons of organic material. The TCLP of the organic material ranged from 1.7 mg/L to 72.4 mg/L prior to stabilization. After stabilization, the TCLP of the treated organic material was 0.13 mg/L.

During processing, additional process control samples were taken on the plant wash water, pre and post water treatment. The pretreatment lead values ranged from 328 ug/L to 9,240 ug/l, with the highest value recorded during processing of the right face soils. After water treatment, the residual lead levels were 14.8 ug/l, demonstrating the effectiveness of the water treatment system in reducing lead levels in process water.

In comparison to prior lab treatability results, the field processing bettered the treatability results for both total lead and TCLP lead as summarized in Table 10. This demonstrated reliable scale-up performance from bench to field as illustrated by the comparison of results shown in Table 13 below.

FIG. 13
Lab Scale vs. Field Treated Soil Comparison

| Source Area | Fraction | Treatability Study Results | | Field Processing Results | |
|---|---|---|---|---|---|
| | | Total Lead mg/kg | TCLP Lead mg/L | Total Lead mg/kg | TCLP Lead mg/L |
| Composite | #10 Mesh Plus (SP-2) | <100 | — | 39-95 | — |
| | #10-Mesh Minus (SP-3) | 243 | — | 38-187 | — |
| Right Face | #10 Mesh Plus (SP-2) | <400 | — | 54-267 | — |
| | #10-Mesh Minus (SP-3) | 3,900 | 1.2* | 246-1,750 | 0.03-0.46** |

Notes:
*Result at 2.5% stabilization dosage rate;
**Result at 1.5% Ecobond Addition.

The processing of the 5,705 tons of feed soil reclaimed by density treatment yielded a 74% reduction in lead. The feed lead is calculated from the recovered lead and the residual lead content of the minus #10 mesh material. The final lead was 116 mg/kg based on the weighted average of sampled product. The particulate lead recovered from the material contributes 333 mg/kg of lead to the source, indicating a feed lead of 450 mg/kg.

TABLE 14

Residual Weight-Averaged Total Lead Levels

| Sample Designation Analytical Method Units | Day | Lead SP-3/4 6010B mg/kg (1) | Soil Processed tons (2) | Contribution % (3) | Contribution Total Lead mg/kg (4) |
|---|---|---|---|---|---|
| SP-3-01 | 1 | 65.1 | 62 | 1.09% | 0.7 |
| SP-3-02 | 2 | 102 | 174 | 3.05% | 3.1 |
| SP-3-03 | 3 | 50.9 | 118 | 2.07% | 1.1 |
| SP-3-04 | 4 | 95.9 | 190 | 3.33% | 3.2 |
| SP-3-05 | 5 | 60.9 | 252 | 4.42% | 2.7 |
| SP-3-06 | 6 | 50.9 | 403 | 7.06% | 3.6 |
| SP-3-07 | 7 | 38.1 | 302 | 5.29% | 2.0 |
| SP-3-08 | 8 | 88.3 | 511 | 8.96% | 7.9 |
| SP-3-09 | 9 | 158 | 371 | 6.50% | 10.3 |
| SP-3-10 | 10 | 167 | 363 | 6.36% | 10.6 |
| SP-3-11 | 11 | 187 | 510 | 8.94% | 16.7 |
| SP-3-12 | 12 | 181 | 565 | 9.90% | 17.9 |
| SP-3-13 | 13 | 99.5 | 558 | 9.78% | 9.7 |
| SP-3-14 | 14 | 89.5 | 606 | 10.62% | 9.5 |
| SP-3-15 | 15 | 165 | 411 | 7.20% | 11.9 |
| SP-3-16 | 16 | 105 | 309 | 5.42% | 5.7 |
| Total SP-3 (5) | | | 5,705 | 100.00% | 116.6 |
| SP-4-01 | 17 | 1,750 | 80 | 4.28% | 74.8 |
| | 18 | 1,750 | 485 | 25.92% | 453.6 |
| SP-4-02 | 19 | 1,300 | 536 | 28.65% | 372.4 |
| SP-4-03 | 20 | 443 | 524 | 28.01% | 124.1 |
| SP-4-04 | 21 | 265 | 246 | 13.15% | 34.8 |
| Total SP-4 (6) | | | 1,871 | 100.00% | 1059.8 |
| Grand Total | | | 7,576 | | |

Notes:
For SP-3 results, (3) = (2)/(5);
For SP-4 results, (3) = (2)/(6); (4) = (3) × (1)

The lead concentration in the second area stockpile of 1,871 tons of feed soil reclaimed by density treatment and stabilization was reduced by 81%. The final weighted average lead concentration was 1,060 mg/kg. The particulate lead contributes 4,623-mg/kg lead and the feed lead was 5,683 mg/kg. The result for the overall composite material for the entire range is a reduction of 80% in lead content in the material processed. The composite feed for the entire range is 1,742 mg/kg and the final composite lead content of treated soil is 350 mg/kg. The weighted average and particulate lead contribution to feed soil total lead levels are summarized on Table 14 and Table 15 respectively.

Using the actual concentration of lead in the coarse (#10-mesh plus) stockpile to calculate the residual lead, results in even greater recovery and lower residual lead demonstrating that the method employed in accordance with the invention is capable of reducing lead levels of firing range soils. The stockpile weight and the sample contribution is not as straight forward as it is for the −#10 mesh material, which was sampled more frequently and with a definite tonnage represented by the sample. When compared to the SP-1 field sample results of 54.8 mg/kg and 1,180 for composite and right face feed soil respectively, the difference is the effect of contaminant "nuggets" in the soil matrix, with the calculated value(s) representing the more accurate value.

TABLE 15

Calculated Total Lead in Feed Soil

| | SP-3 | SP-4 |
|---|---|---|
| Particulate Lead from Table (pounds) | 2100 | 2200 |
| | 1700 | 2200 |
| | | 2200 |
| | | 2150 |
| | | 2400 |
| | | 2100 |
| | | 1850 |
| | | 2200 |
| Total | 3800 | 17300 |
| Particulate Lead (tons) (1) | 1.9 | 8.7 |
| Soil Processed from Table (tons) (2) | 5705 | 1871 |
| Particulate Contribution (mg/kg) (3) | 333.0 | 4,623.2 |
| Residual Weight-Average Contribution from Table (mg/kg) (4) | 116.6 | 1,059.8 |
| Calculated Total Lead (mg/kg) (5) | 449.7 | 5,683.0 |

Notes:
(3) = (1)/(2) × 1,000,000; (5) = (4) + (3)

Verification of Performance Claims:

Based on a review of the performance data from the use of the preset invention for the small-arms firing range soil-washing project, sufficient data exists to support the inventors Claims.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A method for removing contaminants from contaminated soil at a site, comprising the steps of:
   soil diagnostic testing including the steps of:
      extracting a representative sample of the contaminated soil from the site;
      segregating the sample into a plurality of size fractions according to particle size without any testing for contaminants being made;
      segregating each of the size fractions into a plurality of density fractions according to particle density prior to testing for contaminants;
      testing the plurality of density fractions to identify those containing the presence of unaccepteble levels of contaminants representing at least a portion of the total contaminant amount of the sample; and
   field system design and implementation based upon said soil diagnostic testing including the steps of:
      extracting the contaminated soil from the site;
   isolating soil fractions from the contaminated soil at the site corresponding to the identified contaminated density fractions from the sample;
      processing the isolated soil fractions to remove the contaminants therefrom;
      treating the processed soil fractions from the site corresponding to the identified contaminated fractions with at least one stabilization reagent capable of inhibiting the solubility of metal contaminants from the processed soil; and
      returning the treated soil fractions to the site.

2. The method of claim 1 further including the step of reconstituting soil fractions deemed to contain acceptable levels of contamination to the site.

3. The method of claim 1, further including the step of treating the soil fractions containing the unacceptable levels of contaminants to remove the contaminants therefrom.

4. The method of claim 3, further including the step of restoring the treated soil fractions back to the site.

5. The method of claim 1, wherein the total contaminant amount includes particulate and leachable contaminants.

6. The method of claim 1, wherein the particle size segregation step comprises utilizing dry separation, and implementing a wet wash to separate the coarser fraction from the finer fraction.

7. The method of claim 1, wherein the particle size segregation step comprises utilizing a wet separation process.

8. The method of claim 1, wherein the density segregation step comprises utilizing a gravity separation process.

9. The method of claim 1, further including the step of removing ferromagnetic material from the soil fractions.

10. The method of claim 1, further comprising treating the soil fractions from the site corresponding to the identified contaminated fractions with at least one microbial agent.

11. The method of claim 1, wherein the density segregation step comprises elutriating the particle size fractions.

12. The method of claim 1 wherein the density segregation step comprises jigging the particle size fractions.

13. The method of claim 1, further including the step of removing vegetation from the soil fractions.

14. The method claim 1, further including the step of treating the soil fractions from the site corresponding to the identified contaminated fractions with at least one oxidizing agent.

15. The method claim 1 further comprising treating the soil fractions form the site corresponding to the identified fractions with at least one reducing agent.

16. The method of claim 1, wherein the density segregation step comprises generating a first density fraction having a specific density corresponding to vegetative matter, a second fraction having a specific density corresponding to metal and a third density fraction having a specific density intermediate of the vegetative matter and metal.

17. The method of claim 16, wherein the specific density of the first density fraction is in the range of from about 0.8 to 1.2.

18. The method of claim 16, wherein the specific density of the second density fraction is at least 8.

19. The method of claim 16, wherein The specific density of the third density fraction is in the range of from about 2.5 to 3.5.

20. The method of claim 1, wherein the stabilization reagent is capable of stabilizing the metal contaminants by chemically bonding them into a mineral form or other low solubility phases o complexes that are stable over a long period of time.

21. The method of claim 1, wherein the stabilization reagent is selected from the group consisting of mineral apatites, flocculants, pre-mixed flocculants and mixtures thereof.

22. The method of claim 21, wherein the stabilization reagent is apatite II.

23. A method for removing contaminants from contaminated soil at a site, comprising the steps of:
   soil diagnostic testing including the steps of:
      extracting a representative sample of the contaminated soil from the site;
      segregating the sample into a plurality of size fractions according to particle size without any testing for contaminants being made;
      segregating each of the size fractions into a plurality of density fractions according to particle density into a first density fraction having a specific density corresponding to vegetative matter, a second fraction having a specific density corresponding to metal, and a third density fraction having specific density intermediate of the vegetative matter and metal, prior to testing for contaminants;
      testing the plurality of density fractions to identify those containing the presence of unacceptable levels of contaminants representing at least a portion of the total contaminant amount of the sample; and
   field system design and implementation based upon said soil diagnostic testing including the steps of:
      extracting the contaminated soil from the site;
      isolating soil fractions from the contaminated soil at the site corresponding to the identified contaminated density fractions from the sample;
      processing the isolated soil fractions to remove the contaminants therefrom; and
      returning the processed soil fractions to the site.

24. The method of claim 23, further including the step of treating the processed soil fractions from the site corresponding to the identified contaminated fractions with at least one stabilization reagent capable of inhibiting the solubility of metal contaminants from the processed soil.

25. The method of claim 24, wherein the stabilization reagent is capable of stabilizing the metal contaminants by chemically bonding them into a mineral form or other low solubility phases or complexes that are stable over a long period of time.

26. The method of claim 24, wherein the stabilization reagent is selected from the group consisting of mineral apatites, flocculants, pre-mixed flocculants and mixtures thereof.

27. The method of claim 26, wherein the stabilization reagent is apatite II.

28. The method of claim 23, wherein the specific density of the first density fraction is in the range of from about 0.8 to 1.2.

29. The method of claim 23, wherein the specific density of the second density fraction is at least 8.

30. The method of claim 23, wherein the specific density of the third density fraction is in the range of from about 2.5 to 3.5.

* * * * *